Patented June 11, 1940

2,203,690

UNITED STATES PATENT OFFICE 2,203,690

PROCESS FOR THE SEPARATION OF CHLORINATED COMPOUNDS FROM LIQUIDS

Carl J. Malm and Gale F. Nadeau, Rochester, N. Y., assignors to Eastman Kodak Company, Rochester, N. Y., a corporation of New Jersey No Drawing. Application December 4, 1936, Serial No. 114,277

17 Claims. (Cl. 210—62)

This invention relates to a process for purifying alcohols and ketones and more particularly to a process for removing chlorides from such materials.

Large amounts of alcohols or ketones or mixtures of these materials are used as solvents in the industries. For example, alcohol and ketone solvents are employed in the treatment of cellulose esters, photographic materials, and in other industries. Alcohols, ketones and other such solvents in some instances become contaminated with materials such as chlorides. For example, various chlorinated hydrocarbons may contaminate the alcohols or ketones. Also, these materials may be present due to manufacture of alcohol from chlorinated hydrocarbons. These chlorinated hydrocarbons if left in alcohols or ketones are slowly hydrolyzed, giving off hydrochloric acid, which will corrode the storage tanks and other apparatus with which it comes in contact. The removal of such contaminating materials from solvents gives considerable trouble inasmuch as, for example, chlorinated hydrocarbons in such small amounts cannot be effectively separated from alcohols and ketones by fractional distillation.

We have found a method by which such contaminating materials may be readily removed to a substantial extent so that the resultant solvent is relatively free thereof.

This invention has as one object to provide a process for the purification of solvents. Another object is to provide a process for the purification of alcohol and ketone materials which are contaminated with components that tend to hydrolyze to acids. A further object is to provide a process for improving methyl alcohol and acetone. Still another object is to provide a process for treating solvents to remove constituents which are corrosive or become converted to to corrosive components. Still another object is to provide a process for the purification of solvent materials which is simple, efficient and relatively economical. Still another object is to provide a process for the purification of solvents which may be carried out entirely or to a large extent in the liquid phase. Other objects will appear hereinafter.

We have found that due to the effect of contaminating agents, such as the chlorinated hydrocarbons, on surface tension of solvents, such as alcohols or ketones, that the contaminating agents may be removed from the solvents in the liquid phase by an agent such as charcoal. We have also found that this effect may also be increased by the addition of water or other liquids which increase the surface tension of the alcohol or ketones.

Our process is to be readily distinguished from numerous prior art processes on employing charcoal. In considering these processes it will be noted that they may be more or less generally classified as vapor phase treatments. It is apparent that carrying out processes in the vapor phase consumes heat. Also in our process such heating might produce premature hydrolysis of the chlorides or other compound into acidic materials.

Our invention may be better understood by reference to the following examples, which are set forth with particular reference to describing a preferred embodiment and it is to be understood that these examples are not to be construed as limiting our invention.

*Example I.*—Three litres of a mixture consisting of 37% acetone, 10% methyl alcohol, 3% ethylene chloride, and 50% water was filtered through 200 gms. of activated charcoal. The filtrate contained less than .05% ethylene chloride.

*Example II.*—In accordance with this example, the carbon filtering agent was placed in an elongated metal tank about two to three feet in diameter and four to ten feet in height. The solvents to be purified in this instance contained about 50% water, 45% acetone (or methyl alcohol) and 5% ethylene chloride. From the bottom of this carbon purifier solvent was allowed to run into a tank for delivery to stills for final distillation in order to concentrate the solvent.

When effluent solvent contained enough ethylene chloride to give a perceptible odor the flow through the aforementioned tower was stopped. If continuous operation is desired, another similar tower may be cut in at this point. Steam was then sent through the spent tower by admitting it at the bottom thereof. The steam coming from the top of the container carried along the ethylene chloride that was retained by the carbon. This vaporous mixture was condensed and subjected to the usual recovery for such materials.

It is desired to point out in particular that by means of our novel procedure very high removals are obtained. For example, 1000 lbs. of good grade charcoal will remove about 500 lbs. or more of ethylene chloride. This shows that carbon has a particularly high capacity for removing contaminating agents such as chloride.

The aforementioned examples show the treatment of aqueous solutions. As already indicated, we have found that the efficiency of the charcoal in taking up the contaminating agent can be increased by increasing the surface tension of the alcohol or ketone solvent through the addition of water thereto. While in the above examples ethylene chloride has been referred to because this is one of the common constituents encountered, our process may also be applied to various other solvents containing propylene chloride, chloroform, tetra-chloro-ethane and other contaminating agents which might tend to form hydrochloric acid or other corrosive constituents.

Various grades of charcoal may be employed. A good grade of activated charcoal is preferred. It will be observed that our process is carried out to a substantial extent in the liquid phase by feeding the solvent mixture through a filter bed of the absorbing carbon.

It has been mentioned in the prior art that carbon might be employed for removing certain components from aqueous hydrochloric acid. However, from such procedure it is not apparent that carbon would take up corrosive components such as chlorinated materials present in alcohols and ketone solvents.

Our process may generally be applied in the separation of a water-immiscible liquid from a water-miscible liquid by the dilution of the mixture to be treated with water and passing the diluted mixture through activated carbon. It is, therefore, apparent that our invention may be varied and has a relatively wide application. Therefore, we do not wish to be restricted excepting insofar as necessitated by the prior art and the appended claims.

What we claim and desire to secure by Letters Patent of the United States is:

1. A process for treating alcohol and ketone solvents containing ethylene chloride which comprises passing the solvents in contact with carbon whereby at least a part of the ethylene chloride is removed from the solvents.

2. A process for improving alcohol solutions contaminated with at least one aliphatic chlorinated hydrocarbon which comprises passing the alcohol solutions through a charcoal bed whereby at least a part of the chlorinated hydrocarbon is removed and the improved alcohol passes on.

3. A process for improving ketone solutions contaminated with at least one aliphatic chlorinated hydrocarbon which comprises passing the ketone solutions through a charcoal bed whereby at least a part of the chlorinated hydrocarbon is removed and the improved ketone passes on.

4. A process for improving methyl alcohol solutions contaminated with aliphatic chlorinated hydrocarbon materials which comprises contacting the alcohol solutions with a charcoal bed whereby at least a part of the chlorinated materials are removed.

5. A process for improving acetone solutions contaminated with at least one aliphatic chlorinated hydrocarbon which comprises passing the acetone solutions through a charcoal bed whereby at least a part of the chlorinated hydrocarbon is removed and the improved acetone passes on.

6. A process for the purification of aldehydes and ketones containing aliphatic chlorinated hydrocarbon as impurities which comprises passing the aldehydes and ketones to be purified through charcoal and discontinuing the passage of the aldehydes and ketones when the effluent liquid contains enough chloride to give perceptive odor.

7. A process for treating solutions containing methyl alcohol and an olefine chloride to remove at least a part of the chloride, which comprises passing said solutions through charcoal and stopping the flow through the charcoal when the effluent alcohol liquid contains enough olefine chloride to give a perceptible odor.

8. A process for treating solutions containing acetone and at least one aliphatic hydrocarbon chloride to remove at least a part of the chloride, which comprises passing said solutions through charcoal and stopping the flow through the charcoal when the effluent acetone liquid contains enough aliphatic hydrocarbon chloride to give a perceptible odor.

9. A process for improving alcohols and ketone solvents containing an aliphatic hydrocarbon chloride which tend to form acids in the solvents, which comprise passing said solutions through a bed of charcoal between about 4 and 8 feet in depth.

10. A process for treating alcohols and ketone solvents containing aliphatic halogenated hydrocarbon impurities which tend to become converted to corrosive agents by hydrolysis, which comprise adding water to said solvents and then contacting the aqueous solvent solutions with charcoal, whereby the contaminating agents are removed.

11. The process for the separation of halogenated aliphatic hydrocarbon water-immiscible liquid contaminating agent that tends to become converted to acidic materials from a water-miscible liquid solvent from the group consisting of ketones and alcohols to produce a relatively pure solvent which comprises diluting the solvent with water, passing the diluted solvent mixture through activated carbon, whereby the halogenated hydrocarbon contaminating agent is removed, and subjecting the aqueous effluent solvent to distillation.

12. A process for purifying methyl alcohol and acetone which contain an aliphatic hydrocarbon chloride that tends to become converted to acidic materials by hydrolysis, which comprises contacting the methyl alcohol and acetone with charcoal, whereby at least a substantial part of the aliphatic hydrocarbon chloride is removed.

13. A process for purifying acetone which contains an aliphatic hydrocarbon chloride that tends to become converted to acidic materials by hydrolysis, which comprises thoroughly contacting the acetone with charcoal, whereby at least a substantial part of the aliphatic hydrocarbon chloride is removed.

14. A process for treating a chemical mixture of about 30–40% acetone, 5–20% methyl alcohol and small amounts of ethylene chloride to remove a substantial part of the chloride, which comprises rendering said mixture aqueous, and passing the aqueous mixture through activated charcoal.

15. A process for treating a solution containing a substantial amount of methyl alcohol and a smaller amount of ethylene chloride to eliminate at least a part of the chloride which comprises passing said solution through charcoal, discontinuing the flow when the effluent alcohol contains a perceptible odor of chloride, and subjecting the charcoal to treatment for recovering the ethylene chloride therefrom.

16. A process for improving aqueous solutions contaminated with at least one aliphatic chlorinated hydrocarbon and also containing a substantial content of at least one liquid from the group consisting of ketones, lower aliphatic alcohols and aldehydes, which comprises thoroughly contacting said aqueous solutions with charcoal whereby a substantial part of said aliphatic chlorinated hydrocarbon is removed.

17. A process for treating alcohol and ketone solvents contaminated with an aliphatic chlorinated hydrocarbon which has at least three chlorine atoms and 1 to 3 carbon atoms in its molecule, which comprises passing the contaminated solvent in contact with charcoal, whereby at least a substantial part of the aliphatic chlorinated hydrocarbon is removed.

CARL J. MALM.
GALE F. NADEAU.